United States Patent
Schaul et al.

(10) Patent No.: US 12,154,029 B2
(45) Date of Patent: Nov. 26, 2024

(54) CONTINUAL REINFORCEMENT LEARNING WITH A MULTI-TASK AGENT

(71) Applicant: DeepMind Technologies Limited, London (GB)

(72) Inventors: Tom Schaul, London (GB); Matteo Hessel, London (GB); Hado Philip van Hasselt, London (GB); Daniel J. Mankowitz, St Albans (GB)

(73) Assignee: DeepMind Technologies Limited, London (GB)

( * ) Notice: Subject to any disclaimer, the term of this patent is extended or adjusted under 35 U.S.C. 154(b) by 1202 days.

(21) Appl. No.: 16/268,414

(22) Filed: Feb. 5, 2019

(65) Prior Publication Data

US 2019/0244099 A1     Aug. 8, 2019

Related U.S. Application Data

(60) Provisional application No. 62/626,659, filed on Feb. 5, 2018.

(51) Int. Cl.
    *G06N 3/08*     (2023.01)
    *G06N 3/04*     (2023.01)

(52) U.S. Cl.
    CPC .............. *G06N 3/08* (2013.01); *G06N 3/04* (2013.01)

(58) Field of Classification Search
    CPC .................................. G06N 3/08; G06N 3/04
See application file for complete search history.

(56) References Cited

U.S. PATENT DOCUMENTS

2017/0228662 A1\*   8/2017   Gu ..................... G06N 3/0427

OTHER PUBLICATIONS

Sutton, Richard S., and Andrew G. Barto. Reinforcement Learning: An Introduction Second Edition, in Progress. The MIT Press, 2015. (Year: 2015).\*
Xu et al. (Actor-critic reinforcement learning for autonomous control of unmanned ground vehicles, Dec. 2016, pp. 42-47) (Year: 2016).\*
Yu et al. (Stochastic Optimal Relaxed Automatic Generation Control in Non-Markov Environment based on Multi-step Q($\lambda$) Learning , Aug. 2011, pp. 1272-1282) (Year: 2011).\*
Schaul et al. (Universal Value Function Approximators, Jul. 2015, pp. 1-9 ) (Year: 2015).\*

(Continued)

*Primary Examiner* — George Giroux
(74) *Attorney, Agent, or Firm* — Fish & Richardson P.C.

(57) ABSTRACT

A method of training an action selection neural network for controlling an agent interacting with an environment to perform different tasks is described. The method includes obtaining a first trajectory of transitions generated while the agent was performing an episode of the first task from multiple tasks; and training the action selection neural network on the first trajectory to adjust the control policies for the multiple tasks. The training includes, for each transition in the first trajectory: generating respective policy outputs for the initial observation in the transition for each task in a subset of tasks that includes the first task and one other task; generating respective target policy outputs for each task using the reward in the transition, and determining an update to the current parameter values based on, for each task, a gradient of a loss between the policy output and the target policy output for the task.

16 Claims, 4 Drawing Sheets

(56) References Cited

OTHER PUBLICATIONS

Modayil et al. (Multi-timescale nexting in a reinforcement learning robot, Apr. 2014, pp. 146-160) (Year: 2014).*
Dietterich (Hierarchical Reinforcement Learning with the MAXQ Value Function Decomposition, Nov. 2000, pp. 227-303) (Year: 2000).*
Makar et al. (Hierarchical Multi-Agent Reinforcement Learning, Jun. 2001, pp. 246-253) (Year: 2001).*
Abdallah et al. (Multiagent Reinforcement Learning and Self-Organization in a Network of Agents, May 2007, pp. 1-8) (Year: 2007).*
Foerster et al. (Learning to Communicate with Deep Multi-Agent Reinforcement Learning, May 2016, pp. 1-9) (Year: 2016).*
Tan (Multi-Agent Reinforcement Learning: Independent vs. Cooperative Agents, 1993, pp. 1-8) (Year: 1993).*
Abed-Alguni et al. (A multi-agent cooperative reinforcement learning model using a hierarchy of consultants, tutors and workers, Jul. 2015, pp. 213-226) (Year: 2015).*
Vidhate et al. (New Approach for Advanced Cooperative Learning Algorithms using RL Methods (ACLA), Sep. 2016, pp. 12-20) (Year: 2016).*
Sunehag et al. (Value-Decomposition Networks For Cooperative Multi-Agent Learning, Jun. 2017, pp. 1-17) (Year: 2017).*
Abadi et al., "A Computational Model for TensorFlow: An Introduction", Proceedings of the 1st ACM SIGPLAN International Workshop on Machine Learning and Programming Languages, 2017, 7 pages.
Ammar et al., "Safe Policy Search for Lifelong Reinforcement Learning with Sublinear Regret", Proceedings of the 32nd International Conference on Machine Learning, 2015, 9 pages.
Andrychowicz et al., "Hindsight Experience Replay", Advances in Neural Information Processing Systems 30 (NIPS 2017), 11 pages.
Appleyard et al., "Optimizing Performance of Recurrent Neural Networks on GPUs", arXiv: 1604.01946v1, Apr. 7, 2016, 9 pages.
Babaeizadeh et al., "GA3C: GPU-based A3C for Deep Reinforcement Learning", arXiv:1611.06256v1, Nov. 18, 2016, 6 pages.
Bacon et al., "The Option-Critic Architecture", Proceedings of the 31st AAAI Conference on Artificial Intelligence, 2017, 9 pages.
Barreto et al., "Successor Features for Transfer in Reinforcement Learning", Advances in Neural Information Processing Systems (NIPS 2017), 11 pages.
Barth-Maron et al., "Distributed Distributional Deterministic Policy Gradients", arXiv:1804.08617v1, Apr. 23, 2018, 16 pages.
Beattie et al., "DeepMind Lab", arXiv:1612.0380v2, Dec. 13, 2016, 11 pages.
Bellemare et al., "A Distributional Perspective on Reinforcement Learning", Proceedings of the 34th International Conference on Machine Learning (ICML 2017), 70:449-458.
Bellemare et al., "The Arcade Learning Enviroment: An evaluation platform for general agents" Journal of Artificial Intelligence Research, Jun. 2013, 47:253-279.
Bengio et al., "Curriculum Learning", Proceedings of the 26th Annual International Conference on Machine Learning, 2009, 41-48.
Chen et al., "Revisiting Distributed Synchronous SGD", arXiv:1604.00981v3, Mar. 21, 2017, 10 pages.
Chetlur et al., "cuDNN: Efficient Primitives for Deep Learning", arXiv:1410.0759v3, Dec. 18, 2014, 9 pages.
Clemente et al., "Efficient Parallel Methods for Deep Reinforcement Learning", arXiv:1705.04862v2, May 16, 2017, 9 pages.
De Asis et al., "Multip-step reinforcement learning: A Unifying Algorithm", The 32nd Conference on Artificial Intelligence, 8 pages.
Dean et al., "Large scale distributed deep networks", Advances in Neural Information Processing Systems 25 (NIPS 2012), 9 pages.
Finn et al., "Model agnostic meta learning for fast adaption of deep networks", Proceedings of the 34th International Conference on Machine Learning, 2017, 70:1126-1135.
Florensa et al., "Reverse Curriculum Generation for Reinforcement Learning", 1st Conference on Robot Learning, 2017, 14 pages.
Geist et al., "Off Policy Learning with Eligibility Traces: A Survey", Journal of Machine Learning Research 15, 2014, 289-333.
Graves et al., "Automated Curriculum Learning for Neural Networks", arXiv:1704.03003v1, Apr. 10, 2017, 10 pages.
Gruslys et al., "The Reactor: A Fast and Sample Efficient Actor Critic Agent for Reinforcement Learning", arXiv:1704.04651v2, Jun. 19, 2018, 18 pages.
Harutyunyan et al., "Q($\lambda$) with Off Policy Corrections", International Conference on Algorithmic Learning Theory, 2016, 305-320.
He et al., "Identity Mappings in Deep Residual Networks", European Conference on Computer Vision, 2016, 630-645.
Hermann et al., "Grounded Language Learning in a Simulated 3D World", arXiv:1706.06551v2, Jun. 26, 2017, 22 pages.
Hessel et al., "Rainbow: Combining Improvements in Deep Reinforcement Learning", The 32nd Conference on Artificial Intelligence, 2018, 8 pages.
Higgins et al., "B-Vae: Learning Basic Visual Concepts with a Constrained Variational Framework", ICLR, 2(5), 13 pages.
Hochreiter et al., "Long short term memory", Neural Computation, Nov. 1997, 9(8): 1735-1780.
Horgan et al., "Distributed Prioritized Experience Replay", ariv:1803.00933v1, Mar. 2, 2018, 19 pages.
Jaderberg et al., "Population Based Training of Neural Networks", arXiv:1711.09846v2, Nov. 28, 2017, 21 pages.
Jaderberg et al., "Reinforcement Learning with Unsupervised Auxiliary Tasks", arXiv: 1611.05397v1, Nov. 16, 2016, 14 pages.
Kulkarni et al., "Hierarchical Deep Reinforcement Learning: Integrating Temporal Abstraction and Intrinsic Motivation", Advances in Neural Information Processing Systems 29 (NIPS 2016), 9 pages.
LeCun et al., "Gradient Based Learning Applied to Document Recognition", Proceedings of the IEEE, 1998, 86(11):2278-2324.
Leibo et al., "Psychlab: A Psychology Laboratory for Deep Reinforcement Learning Agents", arXiv: 1801.08116v2, Feb. 4, 2018, 28 pages.
Lillicrap et al., "Continuous Control with Deep Reinforcement Learning", arXiv:1509.02971v6. Jul. 5, 2019, 14 pages.
Maei et al., "Toward Off-Policy Learning Control with Function Approximation", Proceedings of the 27th International Conference on Machine Learning, 2010, 8 pages.
Mankowitz et al., "Adaptive Skills Adaptive Partitions (ASAP)", Advances in Neural Information Processing Systems 29 (NIPS 2016), 9 pages.
Mankowitz et al., "Learning Robust Options", The 32nd Conference on Artificial Intelligence, 2018, 6409-6416.
Mnih et al., "Asynchronous Methods for Deep Reinforcement Learning", International Conference on Machine Learning, 2016, 1928-1937.
Mnih et al., "Human level control through deep reinforcement learning", Nature, Feb. 2015, 518(7540):529-533.
Munos et al., "Safe and Efficient Off Policy Reinforcement Learning", Advances in Neural Information Processing Systems 29 (NIPS 2016).
Nair et al., "Massively Parallel Methods for Deep Reinforcement Learning", arXiv: 1507.04296v2, Jul. 16, 2015, 14 pages.
O'Donoghue et al., "The Uncertainty Bellman Equation and Exploration", arXiv:1709.05380v4, Oct. 22, 2018, 13 pages.
Oh et al., "Zero shot task generalization with multi task deep reinforcement learning", Proceedings of the 34th International Conference on Machine Learning, 2017, 70:2661-2670.
Peng et al., "Incremental Multi-Step Q-Learning", Machine Learning Proceedings 1994, Jul. 1994, 226-232.
Precup et al., "Eligibility Traces for Off Policy Policy Evaluation", Proceedings of the 17th International Conference on Machine Learning, 2000, 9 pages.
Precup et al., "Off Policy Temporal Difference Learning with Function Approximation", Proceedings of the 18th International Conference on Machine Learning, 2001, 417-424.
Puterman, "Markov Decision Processes", Handbooks in OR & MS, 1990, 2:331-434.
Ring, "Continual Learning in Reinforcement Enviroments", Dissertation by Mark Bishop Ring, A.B., M.S.C.S., Aug. 1994, 138 pages.

(56) References Cited

OTHER PUBLICATIONS

Rusu et al., "Progressive Neural Networks", arXiv: 1606.04671v3, Sep. 7, 2016, 14 pages.
Salimans et al., "Evolution Strategies as a Scalable Alternative to Reinforcement Learning", arXiv:1703.03864v2, Sep. 7, 2017, 13 pages.
Schaul et al., "Metalearning", Scholarpedia, 2010, 5(6):4650.
Schaul et al., "Universal Value Function Approximators", Proceedings of Machine Learning Research, 37:1-9.
Schulman et al., "High Dimensional Continuous Control Using Generalized Advantage Estimation", arXiv:1506.02438v6, Oct. 20, 2018, 14 pages.
Silver et al., "Mastering the game of Go with deep neural networks and tree search", Nature, 2016, 529:484-503.
Silver et al., "Mastering the game of Go without Human Knowledge", Nature, 2017, 550(7676):354-359.
Sutton et al., "A Convergent O(n) Algorithm for Off-policy Temporal-difference Learning with Linear Function Approximation".
Sutton et al., "Intra-option learning about temporally abstract actions", ICML, 1998, 98:556-564.
Sutton et al., "Reinforcement Learning: An Introduction", Robotica, 1999, 17:229-235.
Tamar et al., "Optimizing the CVaR via Sampling", Proceedings of the 29th AAAI Conference on Artificial Intelligence, 2015, 2993-2999.
Tamar et al., "Scaling Up Robust MDPs using Function Approximation", International Conference on Machine Learning, 2014, 181-189.
Tessler et al., "A Deep Hierarchical Approach to Lifelong Learning in Minecraft", Proceedings of the 31st AAAI Conference on Artificial Intelligence, 2017, 1553-1561.
Vezhnevets et al., "Feudal Networks for hierarchical reinforcement learning", arXiv:1703.01161v2, Mar. 6, 2017, 12 pages.
Wang et al., "Sample Efficient Actor Critic with Experience Replay", arXiv:1611.01224v2, Jul. 10, 2017, 20 pages.
Watkins et al., "Learning from Delayed Rewards", Kings College—Thesis, May 1989, 241 pages.
Watkins et al., "Q-Learning", Machine Learning, May 1992, 8(3-4):279-292.
Wawrzynski, "Real-time reinforcement learning by sequential actor critics and experience replay", Neural Networks, 2009, 22(10):1484-1497.
Zoph et al., "Learning Transferable Architectures for Scalable Image Recognition", IEEE Conference on Computer Vision and Pattern Recognition (CVPR), 2018, 8697-8710.

* cited by examiner

CONTINUAL REINFORCEMENT LEARNING WITH A MULTI-TASK AGENT

CROSS REFERENCE TO RELATED APPLICATIONS

This application is a non-provisional of and claims priority to U.S. Provisional Patent Application No. 62/626,659, filed on Feb. 5, 2018, the entire contents of which are hereby incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes how a system implemented as one or more computers in one or more locations uses an action selection neural network to control, i.e., to select actions to be performed by, an agent that can interact with an environment to perform multiple different tasks.

The subject matter described in this specification can be implemented in particular embodiments so as to realize one or more of the following advantages. The system can effectively train the same neural network to be used for multiple tasks by learning from many parallel streams of experience, i.e., trajectories, coming from a distributed set up. This allows the neural network to be trained efficiently, i.e., using fewer computational resources and with a decreased training time. In particular, the system can leverage similarities between the tasks by learning for a given task based on a trajectory generated while the agent was performing a different task. Because of the nature of the training, the system can effectively train the network without needing target networks or experience replay, decreasing the computational complexity of the system and the amount of computing resources consumed by the training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
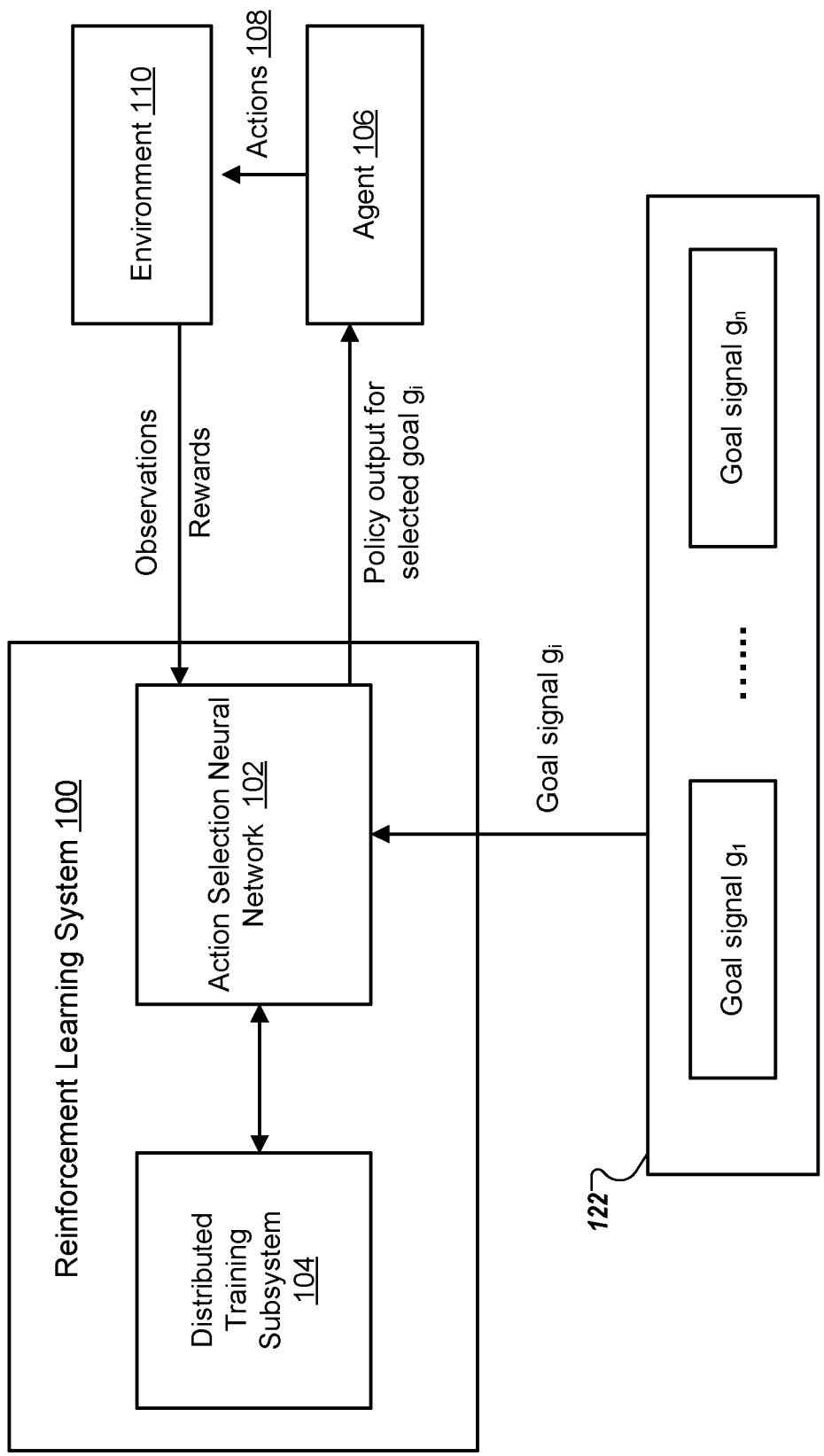
FIG. 1 shows an example reinforcement learning system.

This specification generally describes a reinforcement learning system that uses an action selection neural network to control, i.e., to select actions to be performed by, an agent that can interact with an environment to perform multiple different tasks.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

Optionally, in any of the above implementations, the observation at any given time step may include data from a previous time step that may be beneficial in characterizing the environment, e.g., the action performed at the previous time step, the reward received at the previous time step, and so on.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 includes an action selection neural network 102 that is used to control an agent 106 to effectively perform all of the tasks in a continuing stream of tasks. The continuing stream of tasks includes tasks with dependency chains. For example, the continuing stream of tasks may include industrial tasks for assembling an object, e.g., pick a first part of the object, move and place the first part on top of a second part of the object, pick a third part of the object, and then move and place the third part on top of the first part of the object. In some implementations, the continuing stream of tasks include a fixed number of tasks. In some implementations, the continuing stream of tasks can continually grow in complexity as the agent 106's competence in performing the tasks increases. The agent 106 can be referred to as a continual learning agent that is able to (i) solve multiple tasks, (ii) exhibit synergies when tasks are related, and (iii) cope with deep dependency structures among tasks (e.g., a third part of the object can only be picked after the first part has been placed on top of the second part of the object).

The action selection neural network 102 is a neural network that has a plurality of parameters and is configured to receive a network input including (i) an observation characterizing a state of an environment 110 and (ii) a goal signal $g_i$ from a set of goal signals $\{g_1, \ldots, g_k\}$ (122). The goal signal $g_i$ is a vector that identifies a task i from the continuing stream of K tasks that is being performed by the reinforcement learning agent 106. For example, if the task i is picking up any object of a particular color (e.g., blue), then the goal signal $g_i$ identifying the task i can be represented as a one-hot vector $g_i \in R^8$. As another example, if the task i is picking up an object that has a specific shape and a specific color, the goal signal $g_i$ identifying the task i can be represented as a two-hot binary vector $g_i \in R^8$ with one bit per color and one bit per shape.

Given the network input, the action selection neural network 102 is configured to process the network input in accordance with the parameters to generate a policy output that defines a control policy for the agent 106 for performing the task identified by the goal signal 118. In some implementations, the network input also identifies an action a and the policy output is a Q-value, denoted as $Q(s, a; g_i)$, which is a predicted return that would result from a reinforcement learning agent performing an action a in response to an observation s that characterizes the current state of the environment given the goal signal $g_i$.

The predicted return can be a numeric value representing an estimate of a combination of rewards, e.g, a time-discounted sum of rewards, that would be received by the agent 106 or the system 100 from the environment 110 as a result of the agent performing the action a.

The action selection neural network 102 processes the network input in accordance with the current values of parameters to generate the policy output for the network input.

After the agent 106 performs one or more actions according to the control policy defined by the policy output, the environment 110 transitions to a new state and the action selection neural network 102 receives another observation characterizing the next state of the environment 110 and a reward. The reward can be a numeric value that is received by the system 100 or the agent 106 from the environment 110 as a result of the agent 106 performing the one or more actions according to the control policy. The reward can represent the progress of the agent 106 towards performing the target task (also referred to as on-policy task) identified by the goal signal $g_i$ (on-policy goal signal) as a result of performing the one or more actions.

In particular, in some cases, the agent 106 may perform one or more other tasks (referred to as off-policy tasks) while performing the on-policy task identified by the on-policy goal signal. For example, in the industrial tasks example above, assuming that the on-policy task is picking up the third part of the object, the off-policy tasks can include (i) picking the first part of the object, and (ii) moving and placing the first part on top of the second part of the object. In these cases, the reward can include a respective pseudo-reward for each of the one or more off-policy tasks and the on-policy task. Each pseudo-reward is a numeric value that represents the progress towards performing the corresponding task.

The action selection neural network 102 includes a plurality of neural network layers. For example, the action selection neural network 102 can include a convolutional neural network (which includes one or more convolutional neural network layers) followed by one or more long short-term memory (LSTM) recurrent neural network layers. An example architecture of the action selection neural network 102 is described in more detail below with reference to FIG. 3.

The system 100 can use the same action selection neural network 102 for all of the multiple tasks by conditioning the network 102 on the appropriate on-policy goal signal, i.e., on a goal signal that identifies a on-policy task in the continuing stream of tasks.

In order to use the action selection neural network 102 to allow the agent 106 to effectively perform all of the tasks, the system 100 includes a distributed training subsystem 104 that is configured to train the action selection neural network 102 on trajectories generated while the agent 106 is interacting with the environment 110 to perform at least some of the tasks in the continual stream of tasks. The distributed training subsystem 104 employs a distributed architecture for the training that includes multiple actor computing units (also referred to as actors for simplicity). An example of such a distributed architecture is described in detail with reference to FIG. 2. Other examples of the distributed architecture can be found in L. Espeholt et. al., "IMPALA: Scalable Distributed Deep-RL with Importance Weighted Actor-Learner Architectures," available at https://arxiv.org/abs/1802.01561.

A computing unit may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, some computing units may be a CPU while other computing units may be GPUs.

To train the action selection neural network 102, the subsystem 104 obtains a first trajectory of transitions generated while the agent 106 was performing an episode of the first task from the continual stream of tasks. Each transition in the first trajectory includes an initial observation characterizing a state of the environment 110, an action performed by the agent 106 in response to the observation, a reward received as a result of the agent performing the action, and another observation characterizing a subsequent state of the environment 110.

In some implementations, the subsystem 104 generates the first trajectory by selecting actions to be performed by the agent 106 while performing an episode of the first task using the action selection neural network 102 and in accordance with the current values of the parameters.

In some other implementations, the subsystem 104 obtains the first trajectory of transitions from a queue that stores trajectories generated by actors. Specifically, to create the trajectories in the queue, the subsystem 104 can select, by each of the actors that each control a respective instance of the agent 106, a respective task from the continual stream of tasks. The subsystem 104 then generates, by each of the actors and in parallel, a respective trajectory of transitions by selecting actions to be performed by the respective instance of the agent 106 while performing an episode of the selected task using the action selection neural network 102 in accordance with the current values of the parameters and while the action selection neural network 102 is conditioned on the goal signal for the selected task. The system then adds, by each of the actors, the generated trajectory to a queue of trajectories.

After obtaining the first trajectory from the queue, the subsystem 104 trains the action selection neural network 102 on the first trajectory to adjust the control policies for the continual stream of tasks.

Generally, the subsystem 104 trains the action selection neural network 102 by learning from many parallel streams of experience, i.e., trajectories, coming from multiple actor computing units that are set up in a distributed manner. Because of this, the subsystem 104 can train the neural network 102 efficiently, i.e., using fewer computational resources and with a decreased training time as compared to existing systems. In addition, the subsystem 104 can leverage similarities between the tasks in the continual stream of tasks by training the action selection neural network 102 for a given task based on a trajectory generated while the agent 106 was performing a different task. Thus, the trained action selection neural network 102 can efficiently develop competency for multiple tasks in parallel, thereby reducing the computational resources needed for training different action selection neural networks for different tasks (as required by conventional training methods). Further, because of the nature of the training, the subsystem 104 can effectively train the network 102 without needing target networks or experience replay, decreasing the computational complexity of the system and the amount of computing resources consumed by the training.

The process for training the action selection neural network 102 is described in detail below with reference to FIG. 2 and FIG. 4.

After the training, the system 100 can use the trained action selection neural network 102 to process network inputs and to generate a respective policy output for each network input that defines a control policy for the agent 106 for performing the task identified by the goal signal in the network input. In some implementations, the system 100 can provide the data specifying the trained action selection neural network 102 and the trained parameter values to another system over a data communication network.

Figure 2:
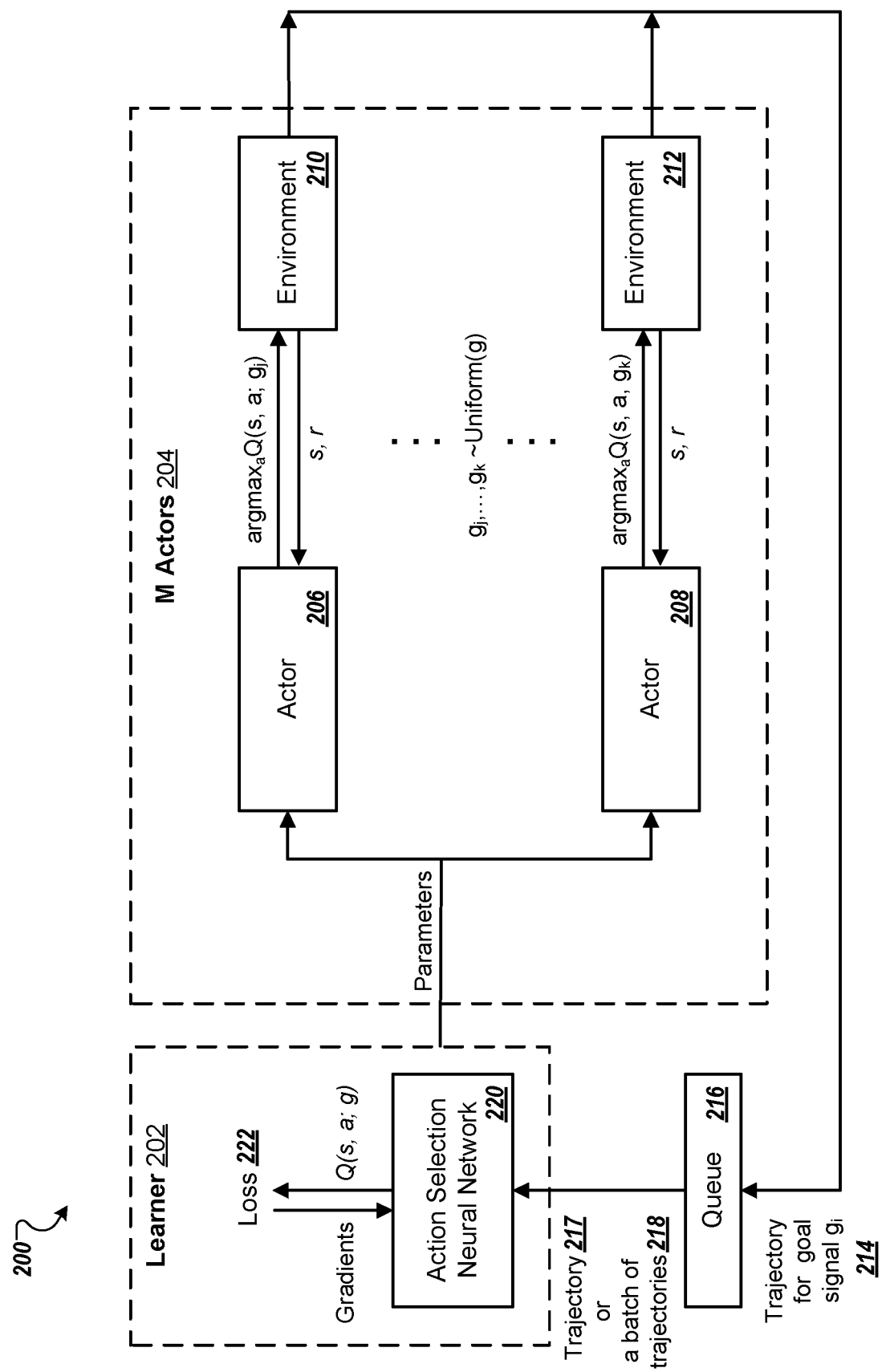
FIG. 2 shows an example distributed architecture for training an action selection neural network.

FIG. 2 shows an example architecture of a distributed training subsystem 200 for training an action selection neural network 220.

The action selection neural network 220 is configured to determine a Q-value, denoted as $Q(s_t, a; g_i)$, which is a predicted return that would result from a reinforcement learning agent performing an action a in response to an observation $s_t$ that characterizes a current state of an environment, given a goal signal $g_i$ that specifies a particular task selected from a set of K tasks. The predicted return can be a numeric value representing an estimate of a combination of rewards, e.g, a time-discounted sum of rewards, that would be received by the agent or the subsystem 200 from the environment as a result of the agent performing the action a.

Generally, the distributed training subsystem 200 includes M actor computing units 204 that are configured to generate trajectories stored in a queue 216, and a learner computing unit 202 that is configured to obtain one or more trajectories from the queue 216 and processes the one or more trajectories to update values of parameters of the action selection neural network 220. In some implementations, the actor computing units 204 and the learner computing unit 202 may be the same type of computing units. In some other implementations, the actor computing units 204 and the learner computing unit 202 may be different types of computing units, for example, the M actor computing units 204 are CPUs while the learner computing unit 202 is a GPU. Each of the M actors 204 controls a respective instance of a reinforcement learning agent using the action selection neural network 220 in accordance with the current values of the parameters of the action selection neural network.

In particular, at each episode, each of the actors is configured to select a goal signal that identifies a respective task from the set of K tasks. For example, each of the actors can uniformly sample a goal signal $g_t$ from a set of K goal signals with each goal signal identifying a respective task from the K task: $g_i$~Uniform (1, . . . , K). Each of the actors independently select a goal signal from other actors.

The selected goal signal $g_i$ is held constant during the entire episode of the respective task.

Each of the actors 204 then generates a respective trajectory of H transitions by selecting actions to be performed by the agent while performing the episode of the selected task using the action selection neural network 220 in accordance with the current values of the parameters and while the action selection neural network 220 is conditioned on the goal signal $g_i$ for the selected task. In some implementations, each of the actors 204 can select actions based on an ϵ-greedy policy after conditioning the action selection neural network 220 on the selected goal signal $g_i$. That is, given an observation $s_t$, each of the actors chooses an action $a_t$ uniformly from a set of possible action A with probability ϵ; and with probability 1-ϵ, the actor chooses an action $a_t$ defined by:

$$a_t = \text{argmax}_a Q(s_t, a; g_i).$$

Each of the H transitions in the respective trajectory can be represented as (s, a, r, s'), where s is an initial observation characterizing a state of the environment, a is an action performed by the agent in response to the observation, r is a reward received as a result of the agent performing the action, and s' is another observation characterizing a subsequent state of the environment. Each of the M actors 204 generates its respective trajectory in parallel with each other actor at each episode.

Once the trajectory of transitions is generated, the actor adds the trajectory to a queue 216 of trajectories.

Each of the M actors 204 can repeat the above process for subsequent episodes to generate more trajectories and add them to the queue 216.

To train the action selection neural network, the learner 202 obtains a first trajectory 217 of transitions from the queue 216. While the first trajectory is generated from one of the M actors 204 conditioned on one of the K goal signals, the learner 202 trains the action selection neural network 220 on the first trajectory to adjust the control policies for all of the K tasks. To do this, the learner 202 performs the following operations for each transition in the first trajectory.

First, the learner 202 generates, in accordance with current values of the parameters, respective policy outputs for the initial observation in the transition for each task in a subset of the set of K tasks that includes the first task and at least one other task. The subset includes K' training tasks that are used for the whole training process. The K' training tasks can be pre-selected from the set of K tasks by an operator. In particular, for each transition t in the first trajectory, the learner 202 processes, for each task i in the subset of K' training tasks, a network input including the initial observation $s_t$ in the transition t and the goal signal $g_i$ for the task i using the action selection neural network 220 and in accordance with the current values of the parameters to generate a respective polity output that includes a Q-value $Q(s_t, a_t; g_i)$ for each action $a_t$ in the set of possible actions A.

The learner 202 then generates respective target policy outputs for each task in the subset using at least a vector representing the reward in the transition. The reward in the transition can include a respective pseudo-reward for each task in the subset. The system can generate the target policy outputs for each task in the subset using the pseudo-reward for the task and not using the pseudo-rewards for any of the other tasks in the subset. That means, a vector including all pseudo-rewards for all tasks in the subset of tasks is visible to the learner 202 on each transition, even if the learner 202 is training the action selection neural network on a specific task. Therefore, even though the action selection neural network may be acting on-policy with respect to a particular task, it can still learn about other tasks from this shared experience in parallel.

The respective target policy outputs for each task i can be n-step returns, denoted as $G_{t,i}^{(n)}$. The learner 202 can compute n-step returns for each task i using the following n-step return estimate equation:

$$G_{t,i}^{(n)} = \Sigma_{k=1}^{n} \gamma^{k-1} r_{\tau_i}(s_{t+k}, a_{t+k}) + \gamma^n \max_a Q(s_{t+n}, a; g_i), \quad (1)$$

where $r_{\tau_i}(s_{t+k}, a_{t+k})$ represent the reward in the transition t for each task i in the subset and γ represents discount rates.

When a trajectory is generated by an actor according to a control policy conditioned on an on-policy goal signal with respect to this trajectory, but used by the learner 202 to learn about the control policy of another off-policy goal signal $g_j$, there may be a mismatch in the action selection between the on-policy and off-policy within the n-steps. To correct the mismatch, in some implementations, when generating n-step returns for each task, the learner 202 determines whether the performed action in the transition is the action having the highest Q-value in the policy output for the current task j. When the performed action in the transition is not the action having the highest Q value in the policy output for the current task j (i.e., wherever $a_t \neq \mathrm{argmax}_a Q(s_t, a; g_j)$), the learners 202 truncates the n-step return using bootstrapping. That means, when computing the n-step returns for each task, the learner 202 does not consider steps where the action chosen by the on-goal signal $g_i$ does not match the action that the off-policy goal $g_j$ (j≠i) would have chosen. In particular, the learner 202 identifies a step index n' where the action chosen by the on-goal signal $g_i$ does not match the action that the off-policy goal $g_j$ (j≠i) would have chosen. The learner 202 then uses a sub-trajectory (of the first trajectory 217) that includes the first n' transitions to compute the respective target outputs for each task as follows:

$$G_{t,i}^{(n')} = \Sigma_{k=1}^{n'} \gamma^{k-1} r_{\tau_i}(s_{t+k}, a_{t+k}) + \gamma^{n'} \max_a Q(s_{t+n'}, a; g_i). \quad (2)$$

This technique helps save computational costs when computing the n-step returns and improves the accuracy of the trained action selection neural network 220.

After generating respective target policy outputs for each task in the subset, the learner 202 determines an update to the current values of the parameters based on, for each task in the subset, a gradient of a loss between the policy output for the task and the target policy output for the task.

More specifically, the loss between the policy output for the task and the target policy output for the task can be expressed as follows:

$$L = \tfrac{1}{2} \Sigma_{i=1}^{K} \Sigma_{t=0}^{H} (G_{t,i}^{(n)} - Q(s_t, a_t; g_i)), \quad (3)$$

where H denotes a number of transitions the first trajectory or the length of the trajectory and $G_{t,i}^{(n)}$ denotes the target policy output for transition t given task i. $G_{t,i}^{(n)}$ can be computed using Eq. (1). In some implementations where the learners 202 truncates the n-step return using bootstrapping, $G_{t,i}^{(n)}$ is computed by using Eq. (2).

In some implementations, the first trajectory 217 is one of multiple trajectories in a batch of trajectories 218 that the learner 202 generates from the trajectories in the queue 216. In these implementations, the learner 202 trains the action selection neural network 220 on each trajectory in the batch to determine a respective update to the current values of the parameters for each trajectory by using the above-described training process. The learner 202 then generates updated values of the parameters from the current values using the updates for the trajectories.

After the learner 202 updates the values of the parameters at each training step, all of the actors 204 are synchronized with the most updated values of parameters of the action selection neural network.

Figure 3:
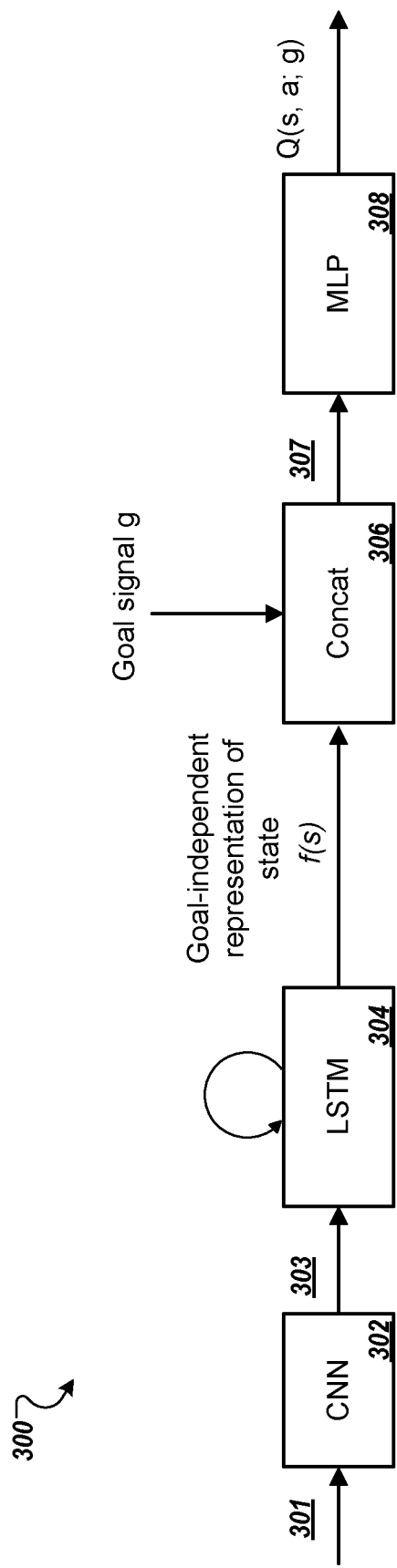
FIG. 3 illustrates an example architecture of an action selection neural network.

FIG. 3 illustrates an example architecture of an action selection neural network 300.

The action selection neural network 300 includes a convolutional neural network 302 followed by a long short-term memory (LSTM) recurrent neural network layer 304 followed by a multi-layer perceptron (MLP) 308 with ReLU non-linearities.

The convolutional neural network 302 is configured to receive a network input 301 that includes (i) a goal signal identifying a task from the plurality of tasks that is being performed by a reinforcement learning agent and (ii) an observation characterizing a state of an environment. The convolutional neural network 302 is configured to process the network input 301 to generate an intermediate output 303 that is fed as input to the LSTM recurrent neural network layer 304. The LSTM recurrent neural network layer 304 is configured to process the intermediate output 303 to generate an internal goal-independent representation f(s) of the state s of the environment. The action selection neural network 300 is then configured to concatenate the internal goal-independent representation f(s) with a goal signal g to generate a second intermediate output 307 that is fed as input to the MLP 308. The MLP 308 is configured to process the second intermediate output 307 to generate the policy output Q(s, a, g) for the task.

Figure 4:
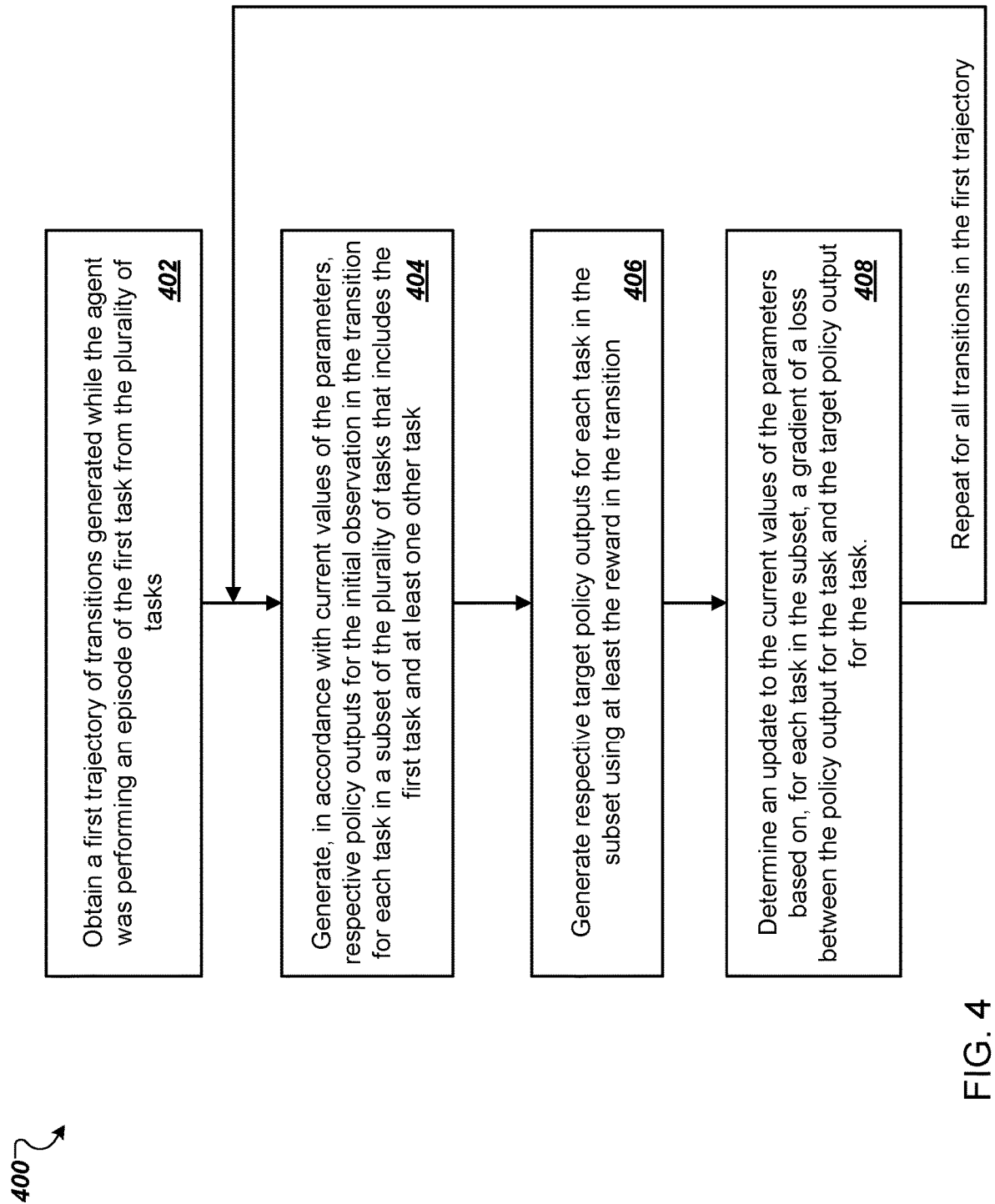
FIG. 4 is a flow diagram of an example process for training an action selection neural network used to control an agent interacting with an environment to perform a plurality of different tasks.

FIG. 4 is a flow diagram of an example process for training an action selection neural network used to control an agent interacting with an environment to perform a plurality of different tasks For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system obtains a first trajectory of transitions generated while the agent was performing an episode of the first task from the plurality of tasks (step 402). Each transition in the first trajectory includes an initial observation characterizing a state of the environment, an action performed by the agent in response to the observation, a reward received as a result of the agent performing the action, and another observation characterizing a subsequent state of the environment.

In some implementations, the system generates the first trajectory by selecting actions to be performed by the agent while performing an episode of the first task using the action selection neural network and in accordance with the current values of the parameters.

In some other implementations, the system obtains the first trajectory of transitions from a queue that stores trajectories generated by multiple actor computing units. Specifically, to create the trajectories in the queue, the system can select, by each of the actors that each control a respective instance of the agent, a respective task from the continual stream of tasks. The system then generates, by each of the actors and in parallel, a respective trajectory of transitions by selecting actions to be performed by the respective instance of the agent while performing an episode of the selected task using the action selection neural network in accordance with the current values of the parameters and while the action selection neural network is conditioned on the goal signal for the selected task. The system then adds, by each of the actors, the generated trajectory to a queue of trajectories.

The system trains the action selection neural network on the first trajectory to adjust the control policies for the plurality of tasks, by performing steps 404-408 for each transition in the first trajectory.

The system generates, in accordance with current values of the parameters, respective policy outputs for the initial observation in the transition for each task in a subset of the plurality of tasks that includes the first task and at least one other task (step 404). In particular, the system processes, for each task in the subset, a network input comprising the initial observation in the transition and the goal signal for the task using the action selection neural network and in accordance with the current values of the parameters to generate the respective policy outputs for the initial observation in the transition for each task. A policy output includes a respective Q value for each action in a set of possible actions that can be performed by the agent, wherein the Q value is an estimate of a return that would be received if the agent performed the action in response to the observation.

The system generates respective target policy outputs for each task in the subset using at least the reward in the transition (step 406).

The system generates respective target policy outputs for each task by computing respective n-step returns for each task in the subset using, for example, Eq. 1.

In some implementations, the reward can include a respective pseudo-reward for each task in the subset. In these implementations, the system generates the target policy outputs for each task in the subset using the pseudo-reward for the task and not using the pseudo-rewards for any of the other tasks in the subset.

In some implementations, when generating n-step returns for each task, the system determines whether the performed action in the transition is the action having the highest Q-value in the policy output for the task. When the performed action in the transition is not the action having the highest Q value, the system truncates the n-step return using bootstrapping.

The system determines an update to the current values of the parameters based on, for each task in the subset, a gradient of a loss between the policy output for the task and the target policy output for the task (step 408). In particular, the system backpropagates the gradient of the loss to determine the update to the current values of the parameters using a conventional reinforcement learning technique, for example, stochastic gradient descent or gradient descent technique.

In this specification and the claims below, the term "subset" is used to refer to at least two and at most all of the tasks in the plurality of tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training an action selection neural network used to control an agent interacting with an environment to perform a plurality of different tasks, wherein the action selection neural network has a plurality of parameters and is configured to:
  receive network inputs each comprising (i) a goal signal that is a vector that identifies a first task from the plurality of tasks that is being performed by the agent, and (ii) an observation characterizing a state of the environment, and
  process each network input in accordance with the parameters to generate a respective policy output for each network input that defines a control policy for the agent for performing the task identified by the goal signal, the method comprising:
obtaining, from a queue of trajectories, a first trajectory of transitions generated while the agent was performing an episode of the first task from the plurality of tasks, each transition in the first trajectory comprising an initial observation characterizing a state of the environment, an action performed by the agent in response to the observation, a reward received as a result of the agent performing the action, and another observation characterizing a subsequent state of the environment, and the first trajectory of transitions being generated using the action selection neural network conditioned on the goal signal that is the vector that identifies the first task; and
training the action selection neural network on the first trajectory to adjust the control policies for the plurality of tasks, comprising, for each transition in the first trajectory:
  generating, in accordance with current values of the parameters, respective policy outputs for the initial observation in the transition for each task in a subset of the plurality of tasks that includes the first task and at least one other task;
  generating respective target policy outputs for each task in the subset using at least the reward in the transition, and
  determining an update to the current values of the parameters based on, for each task in the subset, a gradient of a loss between the policy outputs for the task and the respective target policy outputs for the task;
selecting, by each of a plurality of actor computing units that each control a respective instance of the agent, a respective task from the plurality of tasks, wherein each of the plurality of actor computing units is configured to select a respective task independently from the other actor computing units;
generating, by each of the plurality of actor computing units and in parallel, a respective trajectory of transitions by selecting actions to be performed by the respective instance of the agent that the actor computing unit controls while the respective instance of the agent is performing an episode of the selected task, wherein the actor computing unit is configured to select the actions using the action selection neural network in accordance with the current values of the parameters and while the action selection neural network is conditioned on the goal signal that is a vector that identifies the respective task that the actor computing unit selected, wherein each transition in the respective trajectory of transitions includes: an observation characterizing a state of the environment, an action selected by the actor computing unit using the action selection neural network and performed by the agent in response to the observation, a reward received as a result of the agent performing the action, and another observation characterizing a subsequent state of the environment; and
adding, by each of the plurality of actor computing units, the generated trajectory to the queue of trajectories.

2. The method of claim 1, further comprising:
generating the first trajectory of transitions by selecting actions to be performed by the agent while performing the episode of the first task using the action selection neural network and in accordance with the current values of the parameters.

3. The method of claim 1, further comprising:
generating a batch of trajectories from the trajectories in the queue, wherein the batch includes the first trajectory;
training the action selection neural network on each trajectory in the batch to determine a respective update to the current values of the parameters for each trajectory; and
generating updated values of the parameters from the current values using the updates for the trajectories.

4. The method of claim 1, wherein generating, in accordance with current values of the parameters, respective policy outputs for the initial observation in the transition for each task in a subset of the plurality of tasks that includes the first task and at least one other task comprises:
processing, for each task in the subset, a network input comprising the initial observation in the transition and the goal signal for the task using the action selection neural network and in accordance with the current values of the parameters.

5. The method of claim 1, wherein the policy outputs include a respective Q value for each action in a set of possible actions that can be performed by the agent, wherein the Q value is an estimate of a return that would be received if the agent performed the action in response to the observation.

6. The method of claim 5, wherein generating respective target policy outputs for each task in the subset using at least the reward in the transition comprises:
generating respective n-step returns for each task in the subset.

7. The method of claim 6, wherein generating n-step returns for each task in the subset comprises:
determining whether the performed action in the transition is the action having the highest Q value in the policy outputs for the task; and
when the performed action in the transition is not the action having the highest Q value, truncating the n-step return using bootstrapping.

8. The method of claim 1, wherein the action selection neural network is configured to generate an internal goal-independent representation of the state of the environment and to generate the policy outputs for the task based on the goal signal identifying the task and the goal-independent representation.

9. One or more non-transitory computer readable storage media storing instructions that, when executed by one or more computers, cause the one or more computers to perform operations comprising:
training an action selection neural network used to control an agent interacting with an environment to perform a plurality of different tasks,
wherein the action selection neural network has a plurality of parameters and is configured to:
  receive network inputs each comprising (i) a goal signal that is a vector that identifies a first task from the plurality of tasks that is being performed by the agent, and (ii) an observation characterizing a state of the environment, and process each network input in accordance with the parameters to generate a respective policy output for each network input that defines a control policy for the agent for performing the task identified by the goal signal, wherein the training comprising:

obtaining, from a queue of trajectories, a first trajectory of transitions generated while the agent was performing an episode of a first task from the plurality of tasks, each transition in the first trajectory comprising an initial observation characterizing a state of the environment, an action performed by the agent in response to the observation, a reward received as a result of the agent performing the action, and another observation characterizing a subsequent state of the environment, and the first trajectory of transitions being generated using the action selection neural network conditioned on the goal signal that is the vector that identifies the first task; and training the action selection neural network on the first trajectory to adjust the control policies for the plurality of tasks, comprising, for each transition in the first trajectory:

generating, in accordance with current values of the parameters, respective policy outputs for the initial observation in the transition for each task in a subset of the plurality of tasks that includes the first task and at least one other task;

generating respective target policy outputs for each task in the subset using at least the reward in the transition, and determining an update to the current values of the parameters based on, for each task in the subset, a gradient of a loss between the policy outputs for the task and the respective target policy outputs for the task;

selecting, by each of a plurality of actor computing units that each control a respective instance of the agent, a respective task from the plurality of tasks, wherein each of the plurality of actor computing units is configured to select a respective task independently from the other actor computing units;

generating, by each of the plurality of actor computing units and in parallel, a respective trajectory of transitions by selecting actions to be performed by the respective instance of the agent that the actor computing unit controls while the respective instance of the agent is performing an episode of the selected task, wherein the actor computing unit is configured to select the actions using the action selection neural network in accordance with the current values of the parameters and while the action selection neural network is conditioned on the goal signal that is a vector that identifies the respective task that the actor computing unit selected, wherein each transition in the respective trajectory of transitions includes: an observation characterizing a state of the environment, an action selected by the actor computing unit using the action selection neural network and performed by the agent in response to the observation, a reward received as a result of the agent performing the action, and another observation characterizing a subsequent state of the environment; and adding, by each of the plurality of actor computing units, the generated trajectory to the queue of trajectories.

10. The one or more non-transitory computer readable storage media of claim 9, wherein the operations further comprises:

generating the first trajectory of transitions by selecting actions to be performed by the agent while performing the episode of the first task using the action selection neural network and in accordance with the current values of the parameters.

11. The one or more non-transitory computer readable storage media of claim 10, wherein the operations further comprises:

generating a batch of trajectories from the trajectories in the queue, wherein the batch includes the first trajectory;

training the action selection neural network on each trajectory in the batch to determine a respective update to the current values of the parameters for each trajectory; and generating updated values of the parameters from the current values using the updates for the trajectories.

12. The one or more non-transitory computer readable storage media of claim 9, wherein generating, in accordance with current values of the parameters, respective policy outputs for the initial observation in the transition for each task in a subset of the plurality of tasks that includes the first task and at least one other task comprises:

processing, for each task in the subset, a network input comprising the initial observation in the transition and the goal signal for the task using the action selection neural network and in accordance with the current values of the parameters.

13. The one or more non-transitory computer readable storage media of claim 9, wherein the policy output includes a respective Q value for each action in a set of possible actions that can be performed by the agent, wherein the Q value is an estimate of a return that would be received if the agent performed the action in response to the observation.

14. The one or more non-transitory computer readable storage media of claim 13, wherein generating respective target policy outputs for each task in the subset using at least the reward in the transition comprises:

generating respective n-step returns for each task in the subset.

15. The one or more non-transitory computer readable storage media of claim 14, wherein generating n-step returns for each task in the subset comprises:

determining whether the performed action in the transition is the action having the highest Q value in the policy output for the task; and when the performed action in the transition is not the action having the highest Q value, truncating the n-step return using bootstrapping.

16. A system comprising one or more computers and one or more storage devices storing instructions that, when executed by the one or more computers, cause the one or more computers to perform operations comprising:

training an action selection neural network used to control an agent interacting with an environment to perform a plurality of different tasks, wherein the action selection neural network has a plurality of parameters and is configured to:

receive network inputs each comprising (i) a goal signal that is a vector that identifies a first task from the plurality of tasks that is being performed by the agent, and (ii) an observation characterizing a state of the environment, and process each network input in accordance with the parameters to generate a respective policy output for each network input that defines a control policy for the agent for performing the task identified by the goal signal, wherein the training comprising:

obtaining, from a queue of trajectories, a first trajectory of transitions generated while the agent was performing an episode of the first task from the plurality of tasks, each transition in the first trajectory comprising an initial observation characterizing a state of the environment, an action performed by the agent in response to the observation, a reward received as a result of the agent performing the action, and another observation characterizing a subsequent state of the environment, and the first trajectory of transitions being generated using the action selection neural network conditioned on the goal signal that is a vector that identifies the first task; and training the action selection neural network on the first trajectory to adjust the control policies for the plurality of tasks, comprising, for each transition in the first trajectory:

generating, in accordance with current values of the parameters, respective policy outputs for the initial observation in the transition for each task in a subset of the plurality of tasks that includes the first task and at least one other task;

generating respective target policy outputs for each task in the subset using at least a vector representing the reward in the transition, wherein the vector includes a respective pseudo-reward for each task in the subset, and wherein generating respective target policy outputs for each task in the subset comprises: generating the respective target policy outputs for each task in the subset using the pseudo-reward for the task in the vector and not using the pseudo-rewards for any of the other tasks in the subset, and determining an update to the current values of the parameters based on, for each task in the subset, a gradient of a loss between the policy outputs for the task and the respective target policy outputs for the task;

selecting, by each of a plurality of actor computing units that each control a respective instance of the agent, a respective task from the plurality of tasks, wherein each of the plurality of actor computing units is configured to select a respective task independently from the other actor computing units;

generating, by each of the plurality of actor computing units and in parallel, a respective trajectory of transitions by selecting actions to be performed by the respective instance of the agent that the actor computing unit controls while the respective instance of the agent is performing an episode of the selected task, wherein the actor computing unit is configured to select the actions using the action selection neural network in accordance with the current values of the parameters and while the action selection neural network is conditioned on the goal signal that is a vector that identifies the respective task that the actor computing unit selected, wherein each transition in the respective trajectory of transitions includes: an observation characterizing a state of the environment, an action selected by the actor computing unit using the action selection neural network and performed by the agent in response to the observation, a reward received as a result of the agent performing the action, and another observation characterizing a subsequent state of the environment; and adding, by each of the plurality of actor computing units, the generated trajectory to the queue of trajectories.

* * * * *